UNITED STATES PATENT OFFICE.

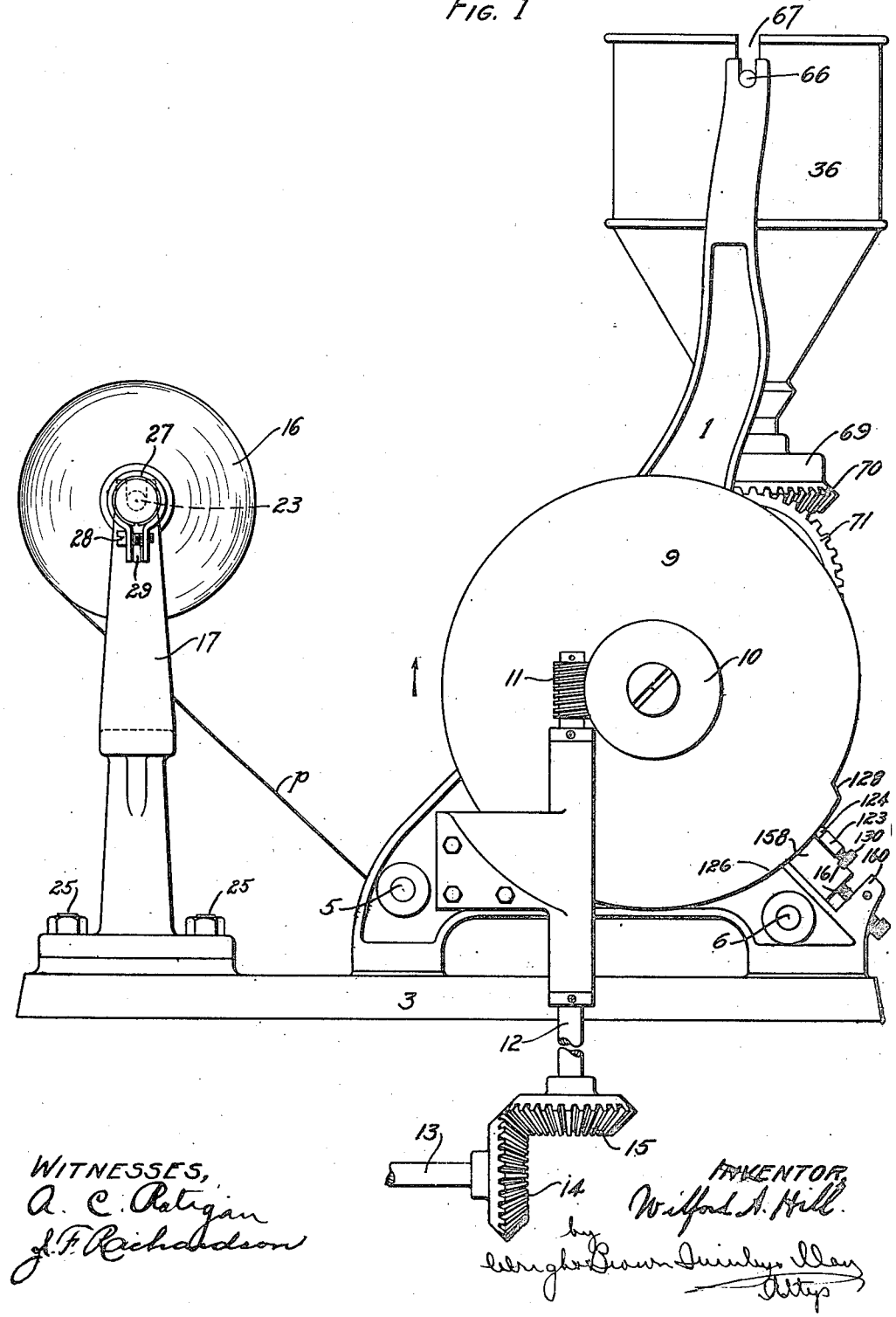

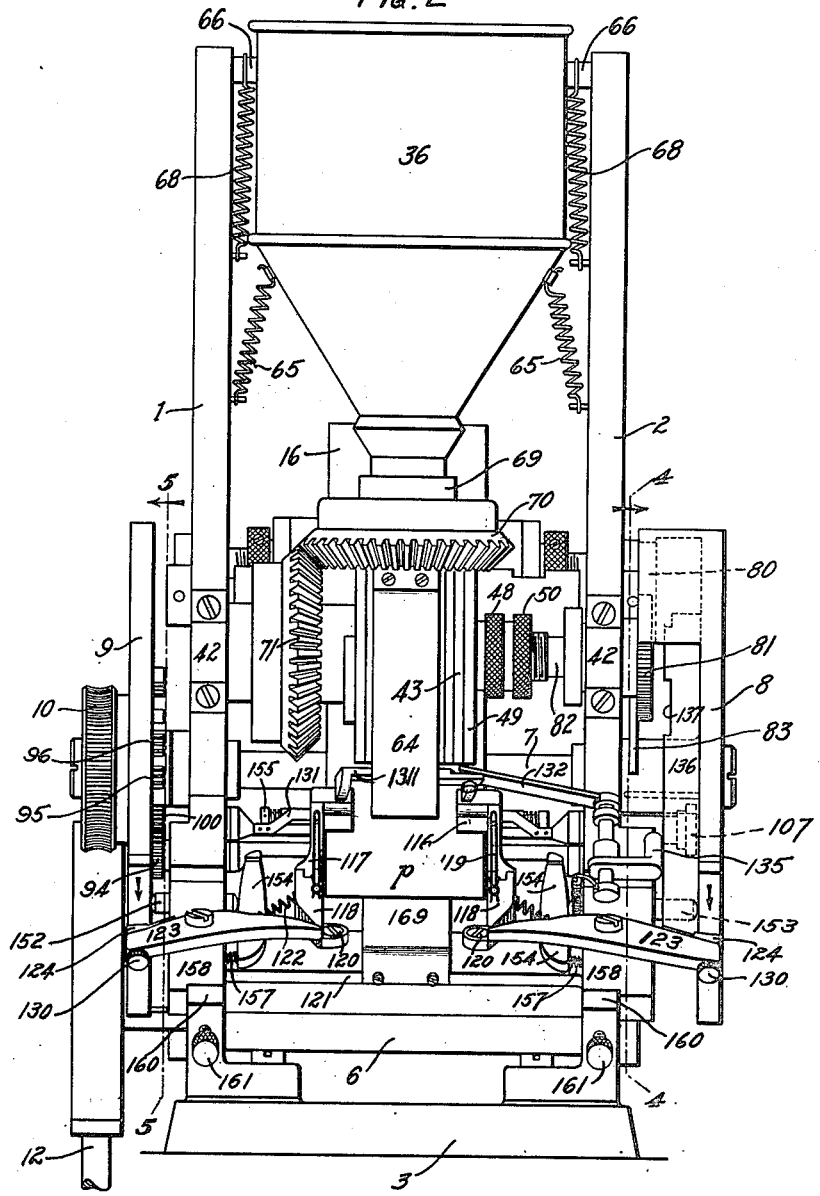

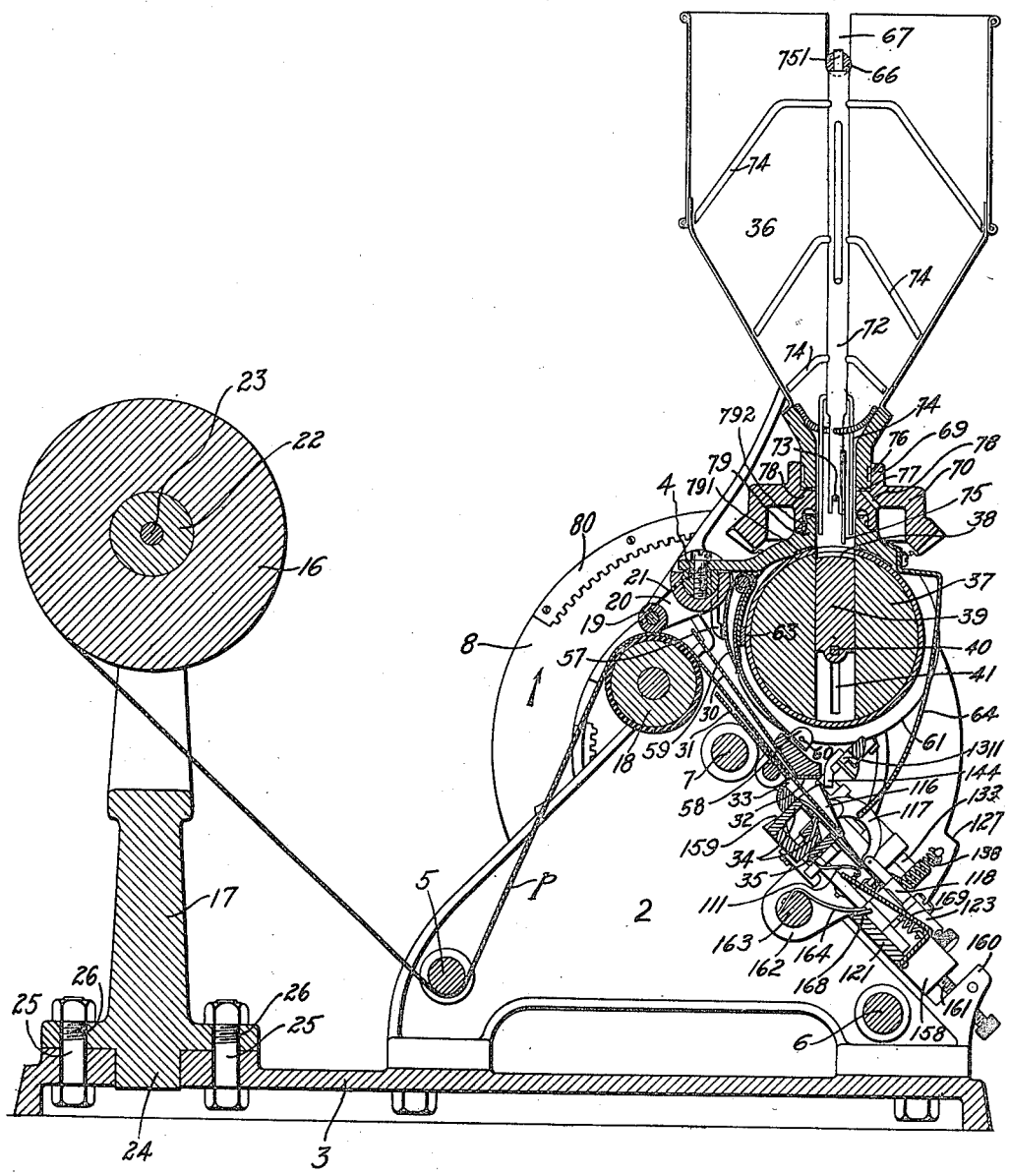

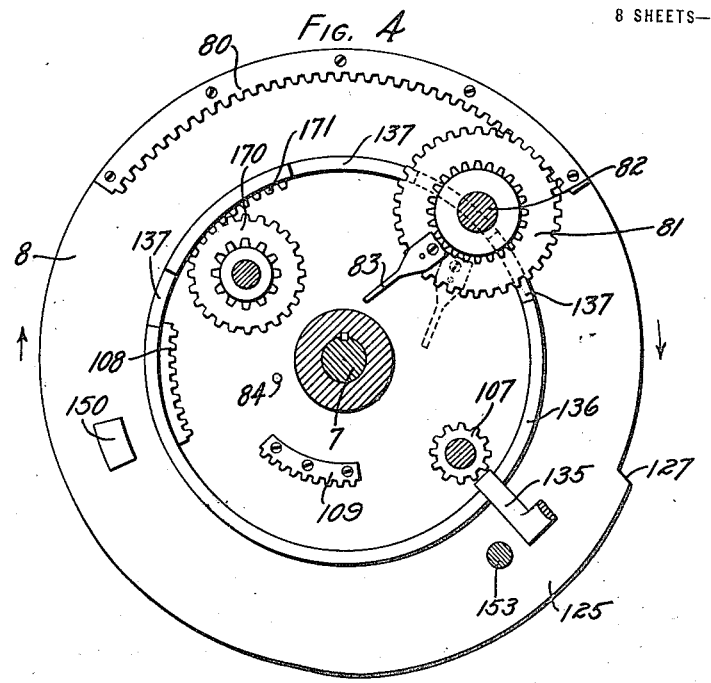
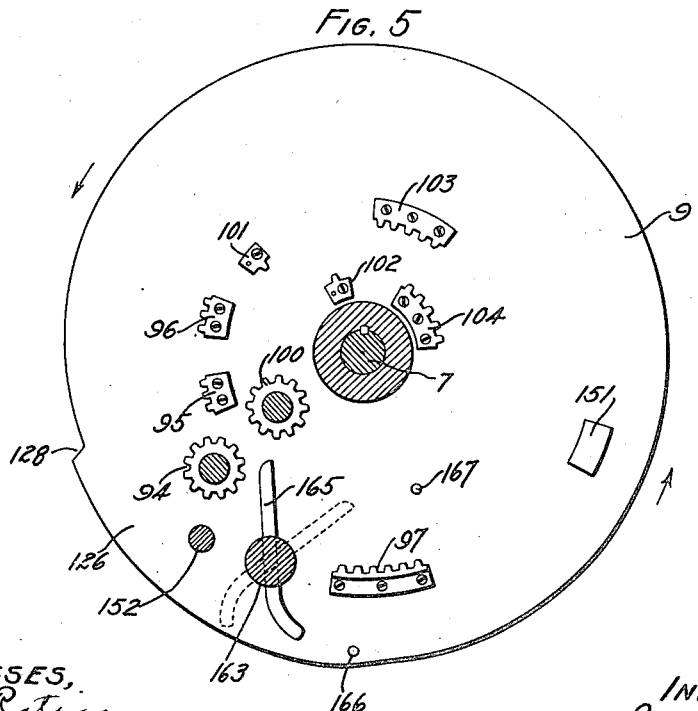

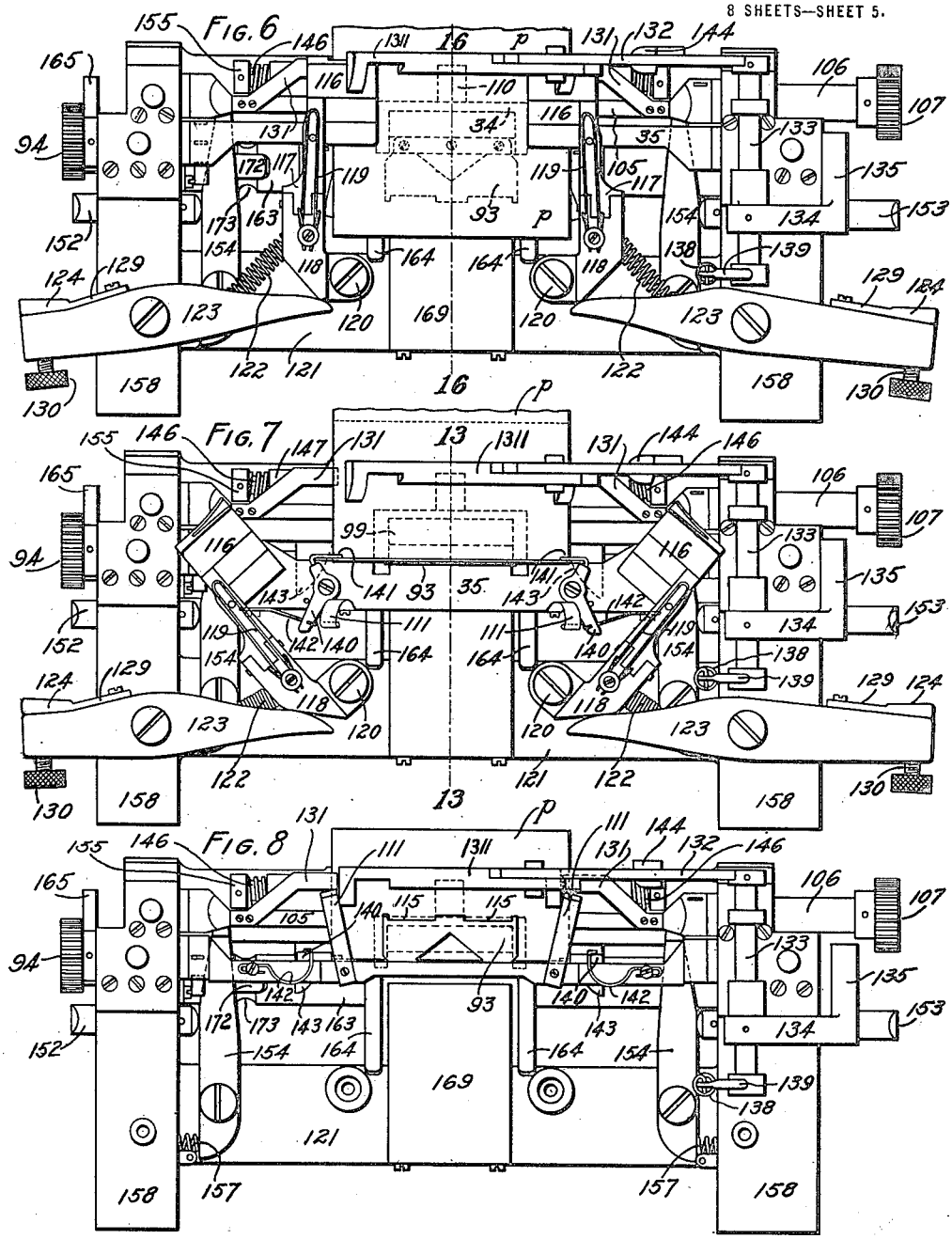

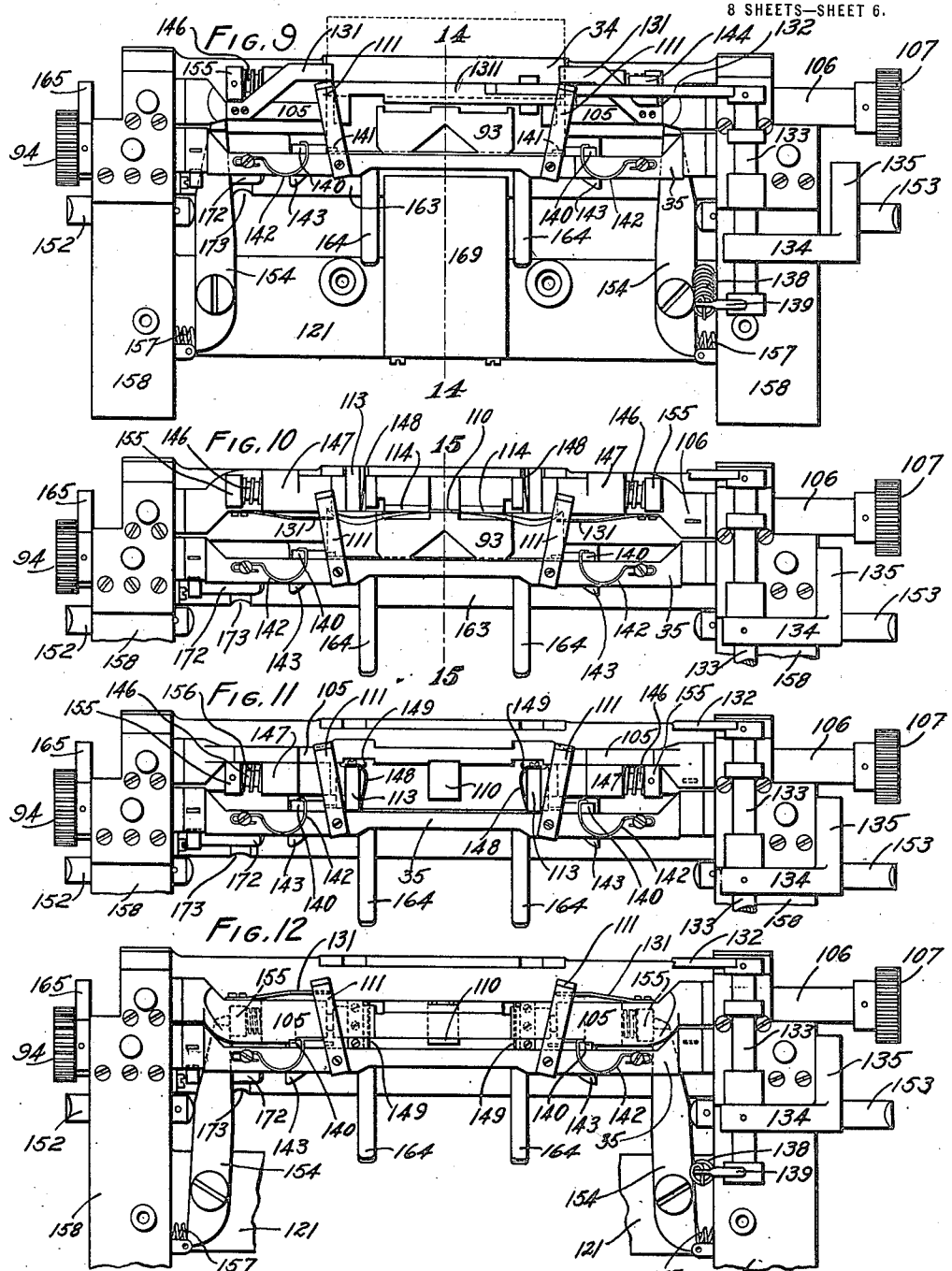

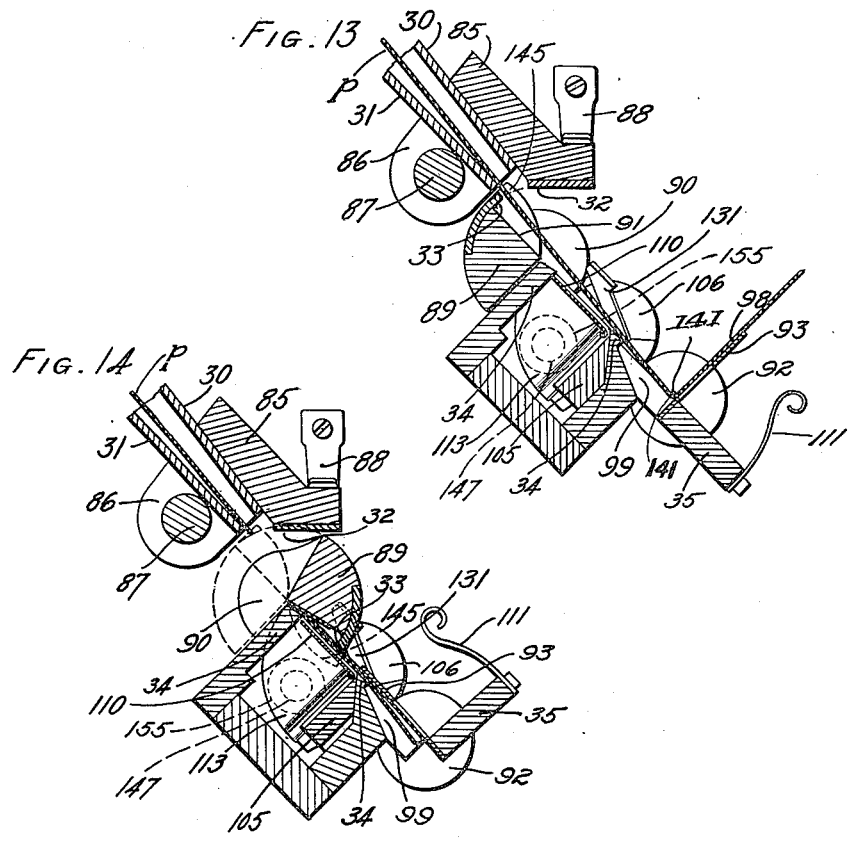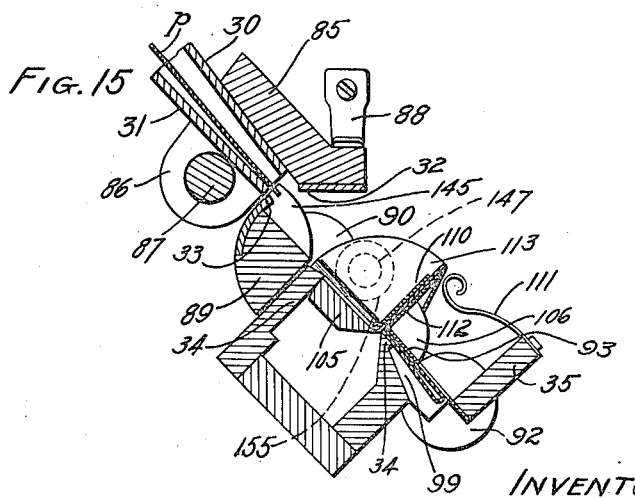

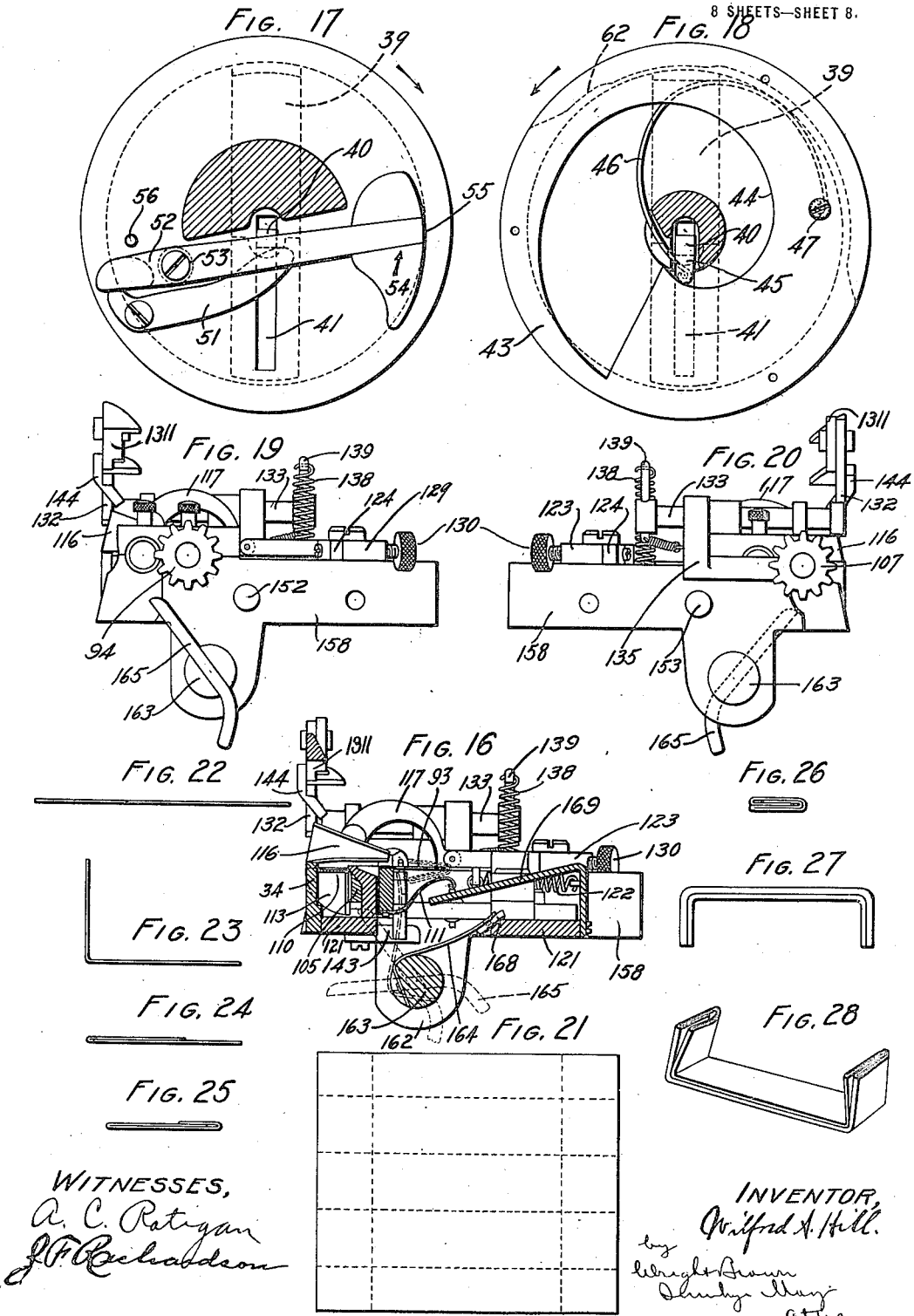

WILFORD A. HILL, OF WALTHAM, MASSACHUSETTS, ASSIGNOR, BY DIRECT AND MESNE ASSIGNMENTS, TO HILL POWDER COMPANY, OF BOSTON, MASSACHUSETTS, A CORPORATION OF MASSACHUSETTS.

POWDER-FOLDING MACHINE.

1,172,209.  Specification of Letters Patent.  Patented Feb. 15, 1916.

Application filed June 12, 1907, Serial No. 378,547. Renewed April 10, 1914. Serial No. 831,053.

*To all whom it may concern:*

Be it known that I, WILFORD A. HILL, of Waltham, in the county of Middlesex and State of Massachusetts, have invented certain new and useful Improvements in Powder-Folding Machines, of which the following is a specification.

This invention relates to machines for folding medicinal and other powders in paper wrappers, and has for its primary object to produce such a machine which is capable in the first place of accurately measuring out equal doses of any predetermined weight and of wrapping the doses or charges of powder in papers better than can be done by hand, and much more rapidly.

Secondary objects, the attainment of each of which is desirable to make an operative and practical machine for this purpose are to provide for completely filling the measuring device, to provide for the complete discharge into the paper wrapper of all the material contained by the measuring device, to construct connections between the rotating stirrer and the stationary frame in such a manner that the powder working between the bearing surfaces of the driving gear for the stirrer and its support may not cause the driver to stick, and to provide new and improved details of folding mechanism by which the paper may be held accurately in place, folded at exactly the right places, and the ends doubled over.

The preferred embodiment of a machine by which the objects above indicated are attained is illustrated in the accompanying drawings, in which,—

Figure 1 represents a side elevation of the machine. Fig. 2 represents a front elevation. Fig. 3 represents a vertical cross section. Fig. 4 represents an elevation of the right-hand operating disk and some of the parts controlled thereby, as seen at the right of line 4—4 of Fig. 2. Fig. 5 represents an elevation of the left-hand operating disk, as seen from line 5—5 of Fig. 2. Figs. 6 to 12 inclusive represent elevations of the mechanism for folding the papers which contain the powders, the same being illustrated in successive steps of the folding operation. Figs. 13, 14 and 15 represent cross sectional views of the cutting and folding mechanisms taken on lines 13—13 of Fig. 7, 14—14 of Fig. 9, and 15—15 of Fig. 10, respectively. Fig. 16 represents a sectional view on line 16—16 of Fig. 6. Figs. 17 and 18 represent sectional elevations of opposite sides of the powder-measuring device, showing the means by which the size of the dose is governed, and the means for discharging the powder. Figs. 19 and 20 represent elevations of different sides of the folding mechanisms. Fig. 21 represents a plan view of a paper blank in which powders are adapted to be folded. Figs. 22 to 28 inclusive represent the paper in the different stages of the folding operation.

The same reference characters indicate the same parts in all the figures.

Referring to the drawings,—the machine comprises two side frames 1 and 2 which are secured upon a base 3 and are connected together by transverse bars 4 5 and 6. A main shaft 7 extends across and is journaled in the side frames, and outside of the latter carries secured to its ends the operating disks 8 and 9. Beside the latter is secured a worm wheel 10 which drives the shaft and disks and is itself driven by a worm 11 on a shaft 12 which receives motion from a counter-shaft 13 through the bevel gears 14 and 15. While the machine is in operation, this driving mechanism is continuously rotating.

The paper is a long strip formed into a roll 16 supported by a bracket 17. It is led under the connecting bar 5 and over a feed roll 18 against which it is held by a pressure roll 19 which is covered with soft frictional material, and carried by the arms of a frame 20 loosely surrounding the transverse rod 4 and pressed toward the roll 18 by springs 21. The roll of paper is wound upon a wooden core 22 which is slipped over a spindle 23 and secured thereon by disks keyed to the spindle and having pointed projections piercing the ends of the core and clamped against the latter by collars threaded upon the spindle. By adjusting the threaded collars, the position of the roll on the spindle may be adjusted so as to feed the paper strip centrally over the feed roll 18. A rotary adjustment for the paper holder is provided by the particular connection between the bracket 17 and base 3. This consists of a cylindrical stud 24 on the bracket entering a hole in the base, and bolts 25 passing through the base into concentric arcuate slots 26 in a flange surrounding the foot of the bracket 17. These two adjustments enable the paper to be led without obliquity and without wrinkling over the feed roll and to the folding mechanisms. The necessary degree of tension is maintained in the paper by a brake 27 surrounding the end of the spindle and clamped against the same with an adjustable pressure by means of the screw 28, the brake being held from rotation by a stud 29 on the bracket 17 which is embraced by the ends of the brake strip.

By the feed roll the paper is pushed through a guide formed by connected plates 30 and 31 and between coöperating knives 32 and 33 and over stationary beds 34 and the folders. After being fed by a single movement as far as indicated in Fig. 3, the lower portion of the paper is folded up at a right angle, as shown in Figs. 7, 13 and 23 to form a bag for receiving the powder. The latter is contained in a hopper 36 from which it is delivered to a rotary measurer 37 which has a cavity 38 to receive the powder and to carry it through a half revolution and dump it into the bag formed by the paper. The construction of the carrier and associated parts is shown in Figs. 3, 17 and 18. It consists of a cylinder pierced by a central transverse diametrical cavity in which is located a plunger 39. Through the latter near one end passes a shaft or bar 40, the ends of which project through longitudinal slots 41 beyond the cylinder 37. The measuring cylinder has hubs which are rotatably mounted in bearings 42 on the frames, and on one of the hubs is rotatably mounted a plate 43 which has an internal spiral cam surface 44 shown in Fig. 18. Against this surface bears a projection 45 carried on one end of the bar 40, being held against the same by a spring 46, the ends of which are connected to the projection 45 and a stud 47 on the measuring cylinder. The tendency of the spring is to force the plunger 39 inwardly so as to deepen the cavity 38, while such motion is resisted by the cam surface 44. Accordingly the rotary adjustment of the latter determines the extent of recession of the plunger, and thereby the powder-receiving volume of the cavity. The limits of the cam are such as to bring the end of the plunger flush with the cylinder surface of the measurer or to retract it almost to the axis thereof, and the proportions of the cavity are great enough to accommodate the largest powder ordinarily put up. Thus the measuring device is capable of supplying any amount of powder accurately measured out from the smallest to the largest dose ever required. Adjustment of the cam disk is made by means of a knurled thumb-nut 48 upon the hub of a disk 49 to which the cam disk is secured, and the adjustment is made permanent by a locking nut 50 screwed upon the hub of the measurer.

On the opposite side of the measuring cylinder is pivoted a lever 51, the long arm of which bears against the end of the bar 40, while the short arm is engaged by the arm of a second lever 52 pivoted to the measuring cylinder at 53, and having a head 54 with a long, external, approximately cylindrical surface 55. When the lever is turned in the direction of the arrow on the head 54, the long arm of lever 51 is caused to press bar 40 inward, and thereby to project the outer end of plunger 39 until its outer end becomes flush with the surface of the cylinder. A pin 56 is provided to arrest the lever 52 and prevent its head being carried too far beyond the periphery of the measurer by centrifugal force.

Beside the end of the measurer which carries lever 52 is an arm 57 secured to the cross bar 4 and projecting downward. This arm is rigid and is located so as to be struck by the head 54 upon every revolution of the measurer. As the latter rotates in the direction of the external arrow in Fig. 17, it carries the end of head 54 against the projection 57, arresting the head and giving it the effect of a motion relatively to the measurer in the direction of the arrow thereon. This projects the plunger and forces the powder from the cavity when the latter is inverted, as will be understood from a comparison of Figs. 3 and 17. The edges of the plunger scrape the powder from the sides of the cavity, thus cleaning the latter and expelling all the powder so as to make an accurate dose. The extended surface 55 continuing in contact with the arm 57, holds the plunger projected until it has passed by a wiper 58 (Fig. 3). This wiper is urged by a spring arm 59 toward the measurer and is normally held away from the surface of the latter by a pin 60 carried thereby and bearing against the rim 61 of the measurer. This rim, however, has a cam-like depression 62 adjacent the cavity (see Fig. 18) which allows the wiper to move into contact with and clean the end of plunger 39 when the latter is inverted and just after the powder has been discharged. A second wiper 63 is held continuously against the surface of the measurer by a spring leaf to which it is fastened, and keeps the cylinder clean. A shield 64 is provided for guiding the powder to the paper and preventing it being scattered.

The hopper 36 which contains the powder is held in place by springs 65 connected to the side frames, and a cross bar 66 passing through diametrically opposite notches 67 in the hopper and likewise connected to the frames by springs 68. The lower end is funnel-shaped and projects into a recess in the hub 69 of a gear 70. The latter meshes with a complemental gear 71 connected with the measuring device so that every time the latter rotates, the gear 70 and a stirrer 72 are rotated also to stir the powder and allow it to fall freely into the measurer.

The stirrer consists of a central bar which engages a pin 73 extending across the bore of gear 70 and having arms 74 and a spade 75 for respectively breaking up lumps and cakes of powder and dislodging the powder packed in the passage. The upper end of the stirrer has a projecting pin 751 journaled in the cross bar 66.

It is practically impossible to prevent the powder working between the bearing surfaces of the gear 70 and accordingly I make provisions for permitting escape of any powder which may work between these surfaces so that it may not cause the device to stick. Such provisions consist of annular grooves 76 and 77 in the end of the hopper outlet, the escape passages 78 through the gear, and radial groves in the end of the hopper outlet. The annular grooves provide clear spaces to receive the powder, while the radial grooves cut it free from the bearing surfaces and feed it into the passages 78. The gear 70 rotates on a stationary support or saddle 79 detachably secured by a screw to the cross-bar 4, on which it has a bearing, and between the adjacent surfaces of the gear and support are similar annular and radial grooves for cutting away and receiving the excess powder. There is an outlet 792 at one side of the bearing for escape of the powder scraped up by the edges of the grooves. I have found that without such grooves the powder is certain to work into the spaces between the parts and in a short time to prevent absolutely their rotation. For a similar purpose the under side of the saddle is cut away at 791 to provide a clearance surrounding a circular lip at the under rim of the outlet passage. The lip cuts the powder from the surface of the measuring cylinder, while at the same time the clearance permits escape of powder which may work through, and prevents the measurer sticking to the saddle.

One of the principal features of the present invention is that whereby the cavity is completely filled at each charging operation. I have found that when the measuring device is brought to rest with its cavity exactly in line with the discharge outlet of the hopper, it does not become fully filled but there is usually a space left near the front side of the cavity which does not receive any powder. Accordingly in the present machine I cause the measurer after discharging one supply, to be carried somewhat further than directly in line with the hopper outlet, so that only a portion of the cavity is in line therewith. Thereupon after this portion has been filled, I retract the measurer slightly so as to bring the opposite side of the cavity under the hopper outlet. Thereby all parts of the measuring cavity are completely filled.

The means for giving these motions to the measurer are illustrated in Fig. 4. As here shown, the right-hand disk 8 has an internal gear segment 80 which is adapted to mesh during part of the rotation of the disk with a pinion 81 on the shaft or hub 82 of the measuring cylinder. The pinion 81 has a finger 83 secured to it, which at certain times, lies in the path of a pin 84 fixed upon the disk. During each revolution of the disk, the segment 80 comes into contact with the gear 81 and gives it slightly more than a complete revolution, starting it from the position indicated by dotted lines in Fig. 4 and leaving it in the position indicated by full lines. In this position the cavity 38 has been carried slightly beyond and out of register with the discharge outlet of the hopper. Immediately after the gear segment has passed out of mesh with the pinion, however, the pin 84 strikes finger 83 and moves the latter back into the dotted-line position, retracting the measuring cavity so that its axis is on the other side of the center of the hopper outlet. The next rotation of the disk carries the measuring cylinder completely around, discharging the contents and leaving it in the first position again. Fig. 3 shows the parts in an intermediate position just after the measurer has been started to carry a supply and dump it on the paper.

It will be noted that on the shaft 82 there are two pinions. Only one of these is used at a time, the larger one being employed when small powders are to be put up. When larger powders are delivered, a disk 8 having a segment of smaller diameter is used, and the small pinion employed, together with a different folding mechanism which, as will be presently described, can be interchanged with the folding mechanism used with this machine.

To return to the cutting and folding mechanism: The knife 32 and guide 30 and 31 are fixed upon a bar 85 which has ears 86 pivotally surrounding a bar or shaft 87. Springs 88 bearing on the bar 85 normally hold the latter in the position shown in Figs. 3, 14 and 15 in which the edge of the knife projects slightly within the path of the movable knife 33. The latter is fixed to a quadrant-shaped bar 89 which has at its ends concentric cylindrical trunnions 90 rotatable in bearings in the side frames.

The flat face 91 of the knife bar is radial to the axis of rotation. When the bar 89 is rotated, it brings the movable knife into contact with the stationary knife and severs a powder-containing blank of paper from the strip. The bar 85 yields under pressure of the movable knife so that the edge of the latter passes by the edge of the fixed knife, while the pressure of the latter insures a clean cut. After rising to cut the paper, the movable knife returns to the position shown in Fig. 3, this being after the first folder 35 rises into the position shown in Figs. 7 and 13. This folder is a bar having circular end trunnions 92, and a rigid radial plate 93. The surface of the plate is normally in the same plane with the surface 91 of the knife bar, and the top of the fixed beds 34. At the left-hand end of the folder bar is secured a pinion 94 which lies near the disk 9 and in position for engagement by segments 95, 96 and 97 on the latter. The first segment engages the pinion and gives it a quarter turn to form the first fold. Then the segment leaves the pinion and the latter remains stationary while the powder is dumped into the angle of the fold. After receiving the powder, the second segment 96 engages the pinion and gives it a second quarter rotation in the same direction, folding the flap 98 of the paper over the mass of powder and flat upon the main body of the paper. The bed 34 has a cavity 99 which receives the bag portion of the paper containing the powder and prevents the pressure breaking the paper. Segment 96 now passes out of engagement with the pinion, leaving the folder in this position until the other folding operations have been performed, whereupon the segment 97 engages the opposite side of the pinion and gives it a half turn in the other direction to return it to first position. The knife block 89 is also a folder to double over the opposite side of the paper. This block carries on its left-hand end a pinion 100 adjacent the disk 9 which is acted upon in succession by gear teeth or segments 101 102 103 104. The first two of these have only one tooth each and may be replaced by pins. The same is true of the other segments, that is, that instead of gear teeth formed upon continuous segments, a series of pins may be used in place of each. The segment 101 first engaging pinion 100, rotates it sufficiently to carry the knife 33 up to cut the paper. The next segment 102 then engages the gear and returns the knife to first position so that the cut edge can be pulled down in front of the knife, by means hereinafter described, and caused to lie flat against the surface 91, this being necessary to make a sharp fold at the required point. Soon after the segment 103 gives the pinion and knife block nearly or quite a half revolution so as to fold over the edge of the paper on the axial edge of the block 89, as shown in Fig. 14. Segment 104 acting on the other side of pinion 100 then restores the knife and block to first position where it remains until a second blank of paper is fed, preparatory to the repetition of the cycle of operations.

Between the parts of the stationary beds is a cavity which receives a third folder 105 for giving the package its last fold, forming it into the shape shown in Fig. 26, and for turning down the ends, as shown in Fig. 27. The third folder has cylindrical trunnions 106 rotatable in bearings, to one of which is secured the pinion 107 at the right-hand side of the machine. This pinion lies closely adjacent the face of disk 8, the relation being represented in Fig. 2, and is acted upon successively by the segments 108 and 109 secured to the face of the disk. The former of these segments turns the folder through three-quarters of a revolution, and the latter returns it immediately after to the first position.

Pivoted to the center of the third folder near the axial edge of the latter is a plate 110 which is normally held by a spring so as to extend at right angles to the surface of the folder. When inoperative, this plate lies in the plane of the bed and the first and second folders. During its first quarter turn, the third folder moves from the position shown in Figs. 9, 13 and 14 to that of Figs. 10 and 15. It raises the body of the paper about the edge of the first folding plate 93 and brings the second fold into engagement with the bent ends of spring fingers 111 which are secured to the first folder bar 35, and projecting near the outer ends of the folded paper. These fingers are so located as to cause the flap doubled over on the second fold to be held smoothly against the portion 112 of the paper turned up by the third fold so that it will lie smoothly between the doubled widths of the paper. After the third folder has made a half revolution, the end folders come into operation, the folder plate 110 meanwhile yielding to permit the necessary continued motion of bar 105 for operating the end folders. The latter are wings 113 extending from the bar 105 at right angles thereto and projecting over the ends of the bed 34. In moving from the position shown in Fig. 11 to that of Fig. 12, these wings wipe the ends of the folded paper downward over the edges of the bed. At the same time wide and shallow protuberances 114 formed upon the third folder on opposite sides of the plate 110 press the last fold with great firmness down upon the bed and between the latter and the recesses 115 formed in the outer edge of the first folder plate 93. These protuberances are provided for the purpose of pressing the fold so tightly that there will be no chance of the resiliency of the paper causing it to open.

Referring to Figs. 6 and 7, it will be seen that there are guides 116 located immediately above the folders and on each side of the bed. These guides are arranged to receive the opposite edges of the paper strip *p* to conduct it over the projections and depressions of the bed and folders. These guides are secured upon arms 117 which are pivoted to levers 118 and caused by springs 119 to rest upon the bed. The levers are pivoted to studs 120 secured to the transverse bar 121 of the frame which carries the folder mechanism. Springs 122 are connected to these levers and to the sides of the frame, tending normally to hold the guides away from the paper in the position shown in Fig. 7. Levers 123 pivoted to the folder frame have arms bearing against inclined surfaces of the lever 118, and on their outer ends have hardened wear pieces 124 which rest against the peripheries of the driving disks 8 and 9, respectively. The latter are circular throughout the greater part of their extent but have eccentric protuberances 125 and 126 terminating in abrupt shoulders 127 and 128. As long as the cam protuberances engage the levers 123, the latter are pressed against levers 118 so as to hold them and the guides in the position shown in Fig. 6, but when the shoulders 127 pass levers 123, the latter and the guides are released and allowed to swing back into the position of Fig. 7, by the action of springs 122. The wear pieces 124 have resilient tongues 129 which are connected near their ends to the levers 123 so that the acting faces of these pieces may be sprung more or less from the edges of the levers by adjusting screws 130. By this means the distance between the guides may be adjusted to take up the wear of the cams and levers. As soon as the paper has been fed forward and the feeding wheel stops, the levers 123 are released and the guides allowed to swing back.

On the bar 105 of the third folder are secured spring arms 131 of which the free ends point toward each other and are separated slightly less than the width of the paper strip. These arms lie close to the bed and when the guides 116 are in receiving position, the latter guide the paper over them. A striker or presser consisting of a piece 131¹ pivoted to an arm 132, fastened to a rock-shaft 133 which is journaled in bearings on the frame of the folding mechanism, is provided for a purpose presently to be described. Such striker or presser is made thus in two parts so that its outer end when raised may not strike the measuring cylinder. In some cases, where there is sufficient room, it will be made in one piece. This rock-shaft has an arm 134 secured to it, the latter being formed with a finger 135 that normally bears against a cylindrical rib or flange 136 on the disk 8, as shown in Figs. 2 and 4. The rib has a number of shallow notches 137 but the major portion thereof extends far enough from the disk to hold the finger arm and presser in the position shown in Figs. 2, 3, 6 and 7, but when one of the notches comes adjacent the finger, a spring 138 acting upon an arm 139 secured to the rock-shaft, forces the presser against the beds, and thereby draws the edges of the paper beneath the springs 131.

Pivoted to the front of the first folder 35 are levers 140 provided with bent fingers 141. Springs 142 bear against the levers and tend to force the fingers toward each other. When the folder is in its inoperative position, the levers bear against stationary cams 143 and are held thereby so that the ends of the fingers lie outside of the edges of the paper. As the folder is turned so as to lift up the end of the paper, these levers are carried free of the cams or stops, and are then thrown inward so that the ends of their fingers lie over the paper at the ends of the fold. The rotation of the folder causes these fingers, because they are slightly eccentric of the folder axis (see Fig. 13), to pull on the paper with the double effect of making the fold distinct and of producing a tension in the paper which draws it forward as soon as cut by the knives, so that the cut edge will lie in front of the movable knife 33 and rest smoothly against the surface 91 of the knife folder bar. The action of the presser 131¹ also serves to hold the paper flat against the surface 91.

The rock-shaft 133 is not only rotatable, but it is also movable endwise in its bearings, and the arm 132 carries a lug 144 which lies in the path of a cam 145 formed upon the knife bar 89. This cam engages the lug 144 when the bar 89 is rotated to fold the paper, and moves the arm 144 and presser downward and forward for the purpose of settling the powder down out of the way of the second and third folds, of tucking the first fold under the spring fingers 131, and of holding the edge of the paper smooth while the second fold is carried down over it. It is to be understood that the presser is raised and lowered at the proper times to secure these effects, by the shoulders at the ends of the several notches 137, said shoulders acting as cams to operate the presser.

After the paper slip has been fed forward the required distance, and just before it has been severed by the cutters, the first of the notches 137 in the rib 136 passes the finger 135 and allows the presser to be drawn downward by its spring, striking the paper with a sharp blow and bearing it against the beds with its edges drawn under the ends of the springs 131. When the knife folder is turned to sever the paper, and while the first folder doubles back the flap of paper which contains the powder, the presser is held elevated out of the way by the raised part of the rib. After these operations take place and the second folder 89 has returned, the presser is caused by the approach of the second notch 137 to strike the bed again and press the severed edge of the paper under or in front of the knife blade 33 attached to the folder bar 89. While bearing on the paper, the presser is moved forward and downward by the action of the cam 145, when the bar 89 is rotated to form a second fold. It is enabled to slide over the flap doubled back by the first folder on account of the fact that when brought down against the paper the second time, its feet were caused to overlie the edge of this flap, and also to the fact that the bottom surfaces of the feet are somewhat beveled toward the front. During the return of the bar 89, the presser is again lifted so that it may clear the edge of the second flap, and after it has been allowed to return by the recession of cam 145 to its normal position, it is allowed to strike the paper for the third time to pass the edges of the upper fold under the spring fingers 131 and smooth this second flap against the beds. The shoulder at the end of the third notch then reaching the finger 135, lifts the presser and the rib 136 holds it out of the way while the final fold and the end folds are made. It is to be understood that when the first folder is carried upward, the presser is raised, and when the second folder is turned toward the front, the presser is pushed forward and downward out of the way also, so that there is never any interference between the folders and the presser. When the presser strikes the paper with a sudden blow, it jars the beds and shakes the powder down into place, also when pushed forward by the cam 145, the presser acts to carry down whatever powder may have lodged on the surface of the paper between it and the first fold.

The end folding blades or wings 113 before referred to are carried by the third folder, but not formed integral with it. Instead they are secured to sliding rods or plungers 146 held in guides 147 formed upon the bar 105. Upon the ends, or rather the sides, of these end folders are spring plates 148 which engage the ends of the folded powders and wipe them over the bed 34 with a yielding pressure. At one edge of each of the wings 113 is secured a spring plate 149 of which the outer end is turned up. The plates 148 149 diverge and serve as yielding pincers for doubling the folded ends of the powders. When the third folder arrives in the position shown in Fig. 12, the meeting portions of the springs 148 and 149 are directly in line with opposite ends of the bed 34. These springs are then carried toward the bed and pass over the edges thereof, thereby carrying the end portions of the powders which have been bent down, as shown in Fig. 27, sharply under the plate so as to double them back at the end folds. It is to be understood that the main function of the spring plates 148 is to coöperate with the spring plates 149 in doubling back and pinching the end folds, and that it is not essential to extend their ends over the faces of the wings 113 far enough to serve as wipers. On the contrary, they may as well terminate a short distance from their points of attachment to the wings, that is, they may extend only as far as the plates 149, leaving to the wings the function of first bending down the ends of the folded powder paper. The means for thus operating the pincer springs comprises cam projections 150 151 formed upon the disks 8 and 9 respectively, which come into contact with plungers 152 and 153 mounted so as to be movable endwise in the frame of the folding mechanisms. These plungers act against levers 154, each of which has one end bearing against a collar 155 on the end of the adjacent plunger 146, which carry the end folders. Springs 156 surrounding the plungers 146, and springs 157 bearing against the levers 154, resist the motion of the plungers and restore the parts to normal position after the cam projections 151 have passed by.

It will be noted that all the folders with the exception of the combined knife and folder, are carried by an independent frame consisting of the side members 158 and the transverse connecting bars 121. The side members contain the bearings for the second and third folders, and to them also is secured the stationary beds. These side members are adapted to fit in recesses formed to receive them in the side members 1 and 2 of the machine frame, and bear against a shoulder 159 at the upper and rearward end of each of these recesses. Projecting through lugs 160 of the main frame are set screws 161 which are adapted to be screwed up against the members 158 to hold them in place, and to be released for the purpose of removing the folder mechanisms. Thus the folders may all be removed at once and a substitute frame carrying a different set of equivalent parts may be substituted. This permits of adapting the machine immediately to folding powders of different sizes without requiring the adjustment of any of the parts.

From the side members of the folder frame project lugs 162 in which is journaled a rock-shaft 163 carrying knock-off spring arms 164. On the left-hand outer end of the rock-shaft is a bar 165 projecting on opposite sides of the shaft and adapted to be struck first at one end and then at the other by the pins 166 and 167 carried by the disk 9. These pins move the bar 165 from the position shown in dotted lines in Fig. 5 to that shown in full lines, and back again, thereby moving the spring arms into the positions shown respectively by full and broken lines in Fig. 16. These movements carry the ends of the spring arms, which have flexible leather friction pieces 168 on their ends, backward to engage the completely folded powder, and dislodge it from the folder plate 93, it being understood that before these knock-off arms are operated, the folder plate has been returned to normal position, as shown in Fig. 16. The leather pieces yield so as to slip back under the folded powders and then engage the powders so as to push them from the folder plate upon a table 169, whence they fall into a suitable receptacle placed to receive them. The rock-shaft 163 is prevented from being turned by the weight of the knock-off arms, by means of a spring 172 which enters a groove 173 in the shaft and acts as a brake.

Referring to Fig. 4, a pinion 170 will be seen in mesh with a gear segment 171. This pinion is fixed to the shaft of the feed roll 18 and is driven to feed the paper by the segment as the disk revolves. This segment is secured to the flange 136 and both it and the pinion are located at a greater distance from the surface of the disk than are the pinion 107 and the segments 108 109 so that these latter segments do not act upon nor disturb in any way the feed pinion 170.

As before stated, the folder frame may be removed and another one substituted. The folder mechanism hereinbefore described and illustrated is one for wrapping up small sizes of powders. In the larger sizes of folding mechanism the presser or striker will be made in one part instead of two parts pivoted together, as here shown, and will be pivoted at one end to the rock-shaft 133 instead of being rigidly connected thereto. The pivotal connection is such that the presser may swing in the plane in which it is here shown as being moved bodily, and the rock-shaft is prevented from endwise movement, the swinging movement of the presser producing the same effect as the downward and forward movement before described, but taking the place of such movement of the presser and rock-shaft as a whole. In the larger size also the levers 140 and pins 141 are fixed stationarily to the folder bar 35 and have no motion relatively to the folder, but only that given to them by the folder as a whole. These parts are built on such a large scale that the guides 116 can guide the paper behind and beneath the pins without requiring movement of the latter.

I claim:—

1. A powder-folding machine, comprising paper-feeding mechanism, a pivotal folder for forming the fold which receives the powder, a cutter which serves the paper and constitutes part of a folder to double one edge of the paper over the other, a final folder and end wiper, bending devices for doubling back the ends of the folded paper, and means for actuating the above-named parts in the proper order.

2. A powder-folding machine, comprising paper-feeding mechanism, a pivotal folder for forming the fold which receives the powder, a cutter which severs the paper and constitutes part of a folder to double one edge of the paper over the other, a final folder and end wiper, means for actuating the above-named parts in the proper order, and means operative after the ends of the folded paper have been turned over by the end wiper for sharply bending back said ends at the end folds.

3. A powder-folding machine, comprising paper-feeding mechanism, a stationary folder-carrying frame, a cutter for severing the paper, a series of folders for forming the fold which receives the powder, doubling the paper over the powder-containing fold, folding down the ends of the paper, and pinching devices for doubling back the end folds, mounted in said frame and operating in stationary locations.

4. A powder-folding machine, comprising paper-feeding mechanism, a cutter for severing the paper, a series of folders for forming the fold which receives the powder and doubling the paper over the powder-containing fold, end wipers for bending over the ends of the folded paper, pincers carried by said end wipers and brought into operative position by the latter, and means for pressing said end wipers and pincers inward toward each other to double back the paper at the end folds.

5. A powder folding machine, comprising paper-feeding mechanism, a cutter for severing the paper, a series of folders for forming the fold which receives the powder and doubling the paper over the powder-containing fold, plungers carried by one of said folders and movable longitudinally thereof, end wipers for bending over the ends of the folded paper formed upon said plungers, and means for forcing said plungers inward after the conclusion of the end-wiping movement to double back the ends of the paper.

6. A powder folding machine, comprising paper-folding mechanism, a cutter for severing the paper, a series of folders for forming the fold which receives the powder and doubling the paper over the powder-containing fold, plungers carried by one of said folders and movable longitudinally thereof, end wipers for bending over the ends of the folded paper formed upon said plungers, resilient pincers or grippers carried by said end wipers, and means for forcing said plungers inward after the conclusion of the end-wiping movement for causing said pincers to double back the ends of the paper.

7. A powder-folding machine comprising paper-feeding mechanism, a pivoted folding plate for turning up one edge of the paper to receive the powder and for laying said turned-up edge flat on the body of the paper, instrumentalities for severing the paper and folding the same over the edge of the plate, mechanism for reversing the plate, and a knock-off for pushing the folded powder-paper from the reversed plate.

8. A powder-folding machine comprising paper-feeding mechanism, a pivoted folding plate for turning up one edge of the paper to receive the powder and for laying said turned-up edge flat on the body of the paper, instrumentalities for severing the paper and folding the same over the edge of the plate, mechanism for reversing the plate, and knock-off means oscillatively moved to engage the folded powder-paper and remove it from the plate.

9. A powder-folding machine, comprising paper-feeding mechanism, a pivoted folder for turning up one edge of the paper to receive the powder, devices operative during the movement of said folder to lie over the side edges of the paper and locate the fold closely adjacent to the axis of the folder, and mechanism for doubling the folded paper and wiping over the ends thereof.

10. A powder-folding machine, comprising paper-feeding mechanism, a pivoted folder for forming the fold which receives the powder, devices carried by said folder arranged to overlie the edges of the paper slightly eccentric of the folder, and locate said fold near the pivotal axis of the folder, and mechanism for doubling the folded paper and wiping over the ends thereof.

11. A powder-folding machine, comprising paper-feeding mechanism, a pivoted folder for forming the powder-receiving fold of the paper, fingers pivotally mounted on the folder so as to lie adjacent to the axis thereof, stationary detents normally holding said fingers away from the edges of the paper, springs acting as the movement of the folder carries said fingers out of engagement with said detents to throw the fingers over the edges of the paper, whereby the fingers are enabled to locate the fold accurately, and mechanism for doubling the folded paper and wiping over the ends thereof.

12. In a powder-folding machine, paper-feeding means, a pivotal bar having a folding surface, a paper-severing cutter carried by said bar with its edge projecting above the folding surface thereof, a pivotal folder for turning up the end of the paper to form the fold which receives the powder, and fingers carried by said folder arranged to overlie the edges of the paper to locate the fold, and caused by the pivotal movement of the folder to draw forward on the paper so as to cause the severed edge thereof to lie on the folding surface of the cutter bar in front of the cutter.

13. In a powder-folding machine, a plurality of folding instrumentalities, retainers mounted on one of said instrumentalities for holding back the edges of the paper in the folding operation and separated from each other by a distance less than the width of the paper, means for feeding paper over said instrumentalities, and a presser for acting on the paper so as to cause it to be held by said retainers.

14. In a powder-folding machine, means for feeding paper, a pivotal folder having retainers thereon adapted to lie over the edges of the paper to hold back the paper while the fold is being made, the adjacent portions of said retainers being separated by a space less than the width of the paper, and a presser for holding the paper against said folder and causing it to be engaged by said retainers.

15. In a powder-folding machine a preliminary folder to make the powder-receiving fold, a pivoted cutter-carrying bar having a folding surface to bend over the edge of the paper opposite to that first folded, a final folder, means for feeding the paper over said folders, and a presser movable toward and from the final folder for holding the paper while the cutter-bar is acting to fold over the end of the paper.

16. In a powder-folding machine, a preliminary folder for forming the powder-receiving fold, a pivoted cutter-carrying bar having a folding surface to double over the opposite edge of the paper, a final folder for again doubling the package, means for feeding the paper over said folders, and a presser movable toward and from the final folder for holding the paper while the cutter-carrying bar acts, said presser being also movable in the direction of feed of the paper.

17. In a powder-folding machine, a first folder arranged to form the fold which receives the powder, a second folder carrying a projecting cutter for severing the papers from a continuous sheet, and a third folder, paper retainers carried by said third folder, a presser movable toward and from said third folder, and means for so moving the presser a number of times during the cycle of operations of the machine to engage the paper with said retainers and to bear on the paper intermittently while certain of the folding operations take place.

18. In a powder-folding machine, a first folder arranged to form the fold which receives the powder, a second folder carrying a projecting cutter for severing the papers from a continuous sheet, and a third folder, a presser movable toward and from said third folder, means for actuating the presser to lay the paper against the folders in front of the cutter, and means for moving the presser transversely to such first motion toward the first folder to settle the powder in the fold and to keep the first folded edge smooth while the opposite end is folded over it.

19. In a powder-folding machine, a first folder arranged to form the fold which receives the powder, a second folder carrying a projecting cutter for severing the papers from a continuous sheet, and a third folder, a presser movable toward and from said third folder, and a rock-shaft by which said presser is carried and by the oscillation of which the presser is so moved.

20. In a powder-folding machine, a first folder arranged to form the fold which receives the powder, a second folder carrying a projecting cutter for severing the papers from a continuous sheet, and a third folder, a presser movable toward and from said third folder, and a rock-shaft by which said presser is carried and by the oscillation of which the presser is so moved, said rock-shaft being movable endwise in its bearings, whereby a motion transverse to the first-described motion is given to the presser.

21. In a powder-folding machine, a first folder arranged to form the fold which receives the powder, a second folder carrying a projecting cutter for severing the papers from a continuous sheet, and a third folder, a presser movable toward and from said third folder, a rock-shaft by which said presser is carried and by the oscillation of which the presser is so moved, said rock-shaft being movable endwise in its bearings, whereby a motion transverse to the first-described motion is given to the presser, means for oscillating the rock-shaft, and a cam carried by said second folder for moving the presser and rock-shaft in the direction of the length of the latter.

22. A powder-folding machine, comprising a main frame, a holder for the powder adapted to discharge the powder in limited quantities, means for feeding paper and severing pieces therefrom to contain charges of the powder, said parts being mounted on said main frame; a secondary frame detachably secured to said main frame, instrumentalities mounted in said secondary frame for folding the paper about a mass of powder; said secondary frame and the instrumentalities mounted therein being bodily removable from the main frame to permit substitution of a set of instrumentalities adjusted for folding powders of a different size, means for operating said folding instrumentalities projecting from the secondary frame, and actuating means on the main frame adapted to engage with said operating means and operate said members when the secondary frame is in place.

23. In a machine of the character described having folding instrumentalities, retainers for holding a paper acted on by said instrumentalities and a presser or striker for engaging the edges of the paper with said retainers; a driving disk provided with a cam rib for operating said presser.

24. In a machine of the character described having folding instrumentalities, pinching devices for doubling back both ends of a folded paper; said devices each consisting of coöperating resilient fingers adapted to squeeze the doubled end of the paper between them.

25. In a machine of the character described having folding instrumentalities, guides for conducting a paper strip over the inequalities of said instrumentalities; means tending to move said guides away from the strip, and driving disks having peripheral protuberant cam portions for holding said guides in operative position and releasing them.

26. In a machine of the character described having pivotally mounted paper-folding devices, means for feeding paper to said folding devices, guides for conducting the paper across said devices; a driving disk having toothed gear segments on one of its faces, for actuating the folding devices, and a peripheral cam protuberance operative to hold one of the guides in active position.

27. In a machine of the character described having pivotally mounted paper-folding devices, means for feeding paper to said folding devices, guides for conducting the paper across said devices and a striker or presser for holding down the paper on the folders; and a driving disk having on its periphery a cam protuberance for holding one of said guides in active position, and on one of its lateral faces a plurality of disconnected gear segments for actuating the folders, and a flange provided with projections and recesses for controlling the action of the striker.

28. In a powder-folding machine of the character described, folding instrumentalities, a pair of coöperating paper cutters, means for feeding a strip of paper between said cutters, and a paper guide through which the paper strip is fed, said guide being secured to one of the cutters, whereby it partakes of the motion thereof and causes the strip to pass between the cutters without obstruction.

29. In a powder-folding machine, a rotarily movable folding device, a yielding member carried by said folding device in advance of the folding surface thereof, adapted to double over a flap of the powder-containing paper and to remain against the paper while the folding device continues to advance.

30. In a powder-folding machine, a stationary bed, a folder, a yielding plate carried by said folder for doubling a powder-containing paper against the bed, and end wipers carried by said folder for bending the ends of the doubled paper over the ends of the bed, said yielding plate being in advance of said end wipers, whereby a fold is made by the plate before the end wipers become operative.

31. In a powder-folding machine, a stationary bed, a folder pivotally mounted beside said bed, end wipers carried by the folder adapted to pass the ends of the bed for bending down the ends of a folded powder-containing paper, and a yielding folding plate mounted on the pivotal axis of the folder angularly in advance of the end wipers for doubling the paper and laying it flat against the bed before the end wipers become operative.

32. In a powder-folding machine, a stationary bed, a folder pivotally mounted beside said bed, movable so as to double over the edge of a powder-containing paper against the bed, and shallow protuberances on said folder for sharply pinching the doubled edge of the paper against the bed.

33. A powder-folding machine comprising a main frame having shoulders and adjustable clamps, a subsidiary frame adapted to fit between said shoulders and clamps and to be secured by setting up the latter; powder-measuring, paper-feeding, and paper-cutting means mounted on said main frame; and a set of folding instrumentalities constructed and arranged to perform a series of steps in folding paper about quantities of powder, mounted on the subsidiary frame and removable bodily with the latter to permit substitution of another frame and set of folding instrumentalities having a different adjustment, said subsidiary frame having provisions for holding the folding instrumentalities in operative relation when separated from the main frame.

34. A powder-folding machine comprising a plurality of frames, a powder-measuring and paper-supplying means carried by one of said frames, folding instrumentalities carried by another frame organized to perform a series of coördinated steps resulting in wrapping the paper around a charge of powder, the second-named frame having provisions, independent of any part of the first frame, for retaining said instrumentalities in operative correlation, and securing means for detachably connecting said frames together in operative relation, the detachable connection permitting various combinations between the powder-measuring and paper-folding instrumentalities to be made for putting up different sized powders.

35. In a machine of the character described, having instrumentalities for doubling a paper around a charge of powder and bending over the ends of the doubled paper, pinching devices each consisting of two plates having a space between them to receive the end folds movable inward toward the end folds whereon the ends of the paper are bent, and arranged to grip such ends and double them back.

36. In a powder-folding machine a stationary bed, and a folder pivotally mounted beside said bed and movable to double over a powder-holding sheet against the bed, such bed and folder constituting coöperating folding members, one of which is provided with shallow protuberances located near the line of fold for sharply pinching the fold.

37. A powder-folding machine including a stationary bed, a folder adapted to bend up one end of a sheet placed upon said bed to form a pocket to receive powder and to lay such end against the bed, and a final folder for doubling the paper over the pocket, such final folder and bed constituting coöperating folding members, and one of them having protuberances arranged to pinch the sheet at the final fold.

38. In a powder-folding machine, means for feeding paper, a support for the paper, retainers on said support adapted to lie over the edges of the paper and hold the paper while a fold is being made, means for folding the paper, and a device for placing the edges of the paper beneath said retainers.

39. In a powder-folding machine, a pivoted cutter-carrying bar having a folding surface to bend over the edge of a powder wrapper, a member on which the wrapper is held while said cutter-carrying bar makes a fold, spring retainers mounted upon said member adapted to overlie the edges of the wrapper to retain the same while the fold is being made, and a device for placing the edges of the paper beneath the retainers.

40. A powder folding machine comprising a stationary support, means for bending up one end of a sheet resting on said support and laying such end back on the sheet, means for bending the opposite edge of the sheet over the edge of said bent back end, means for doubling the sheet between the bends so made, means for folding the ends of the folded sheet over the edges of the support, and means for pinching the end folds.

41. In a powder machine, the combination with instrumentalities for folding a powder paper and bending over the ends of the folded paper, of pinching means constructed and arranged to grasp the folded paper at the folds whereon the ends are bent over, and press on the opposite sides of such folds.

42. In a powder folding machine a bed adapted to support a powder wrapper and having projections at the ends of the supporting portion thereof, instrumentalities for folding a powder wrapper supported by the bed and for bending the ends of the folded wrapper over said projections at the ends of the bed, pinching means located adjacent to the ends of the bed, and means for causing said pinching means to grasp the bends of the wrapper on each side of said projections and press the same against the projections.

43. In a powder folding machine, a bed adapted to support a powder wrapper while being folded, instrumentalities arranged and operated to fold a wrapper lying on said bed and to bend the ends of the folded paper over the end edges of the bed, and means for doubling back the said ends of the wrapper sharply under the end edges of the bed.

44. In a powder folding machine a bed, instrumentalities arranged and operable to fold a powder wrapper placed over said bed and to bend the ends of the folded wrapper around the end edges of the bed, pinching devices located adjacent to each end of the bed, and means for moving said devices toward the ends of the bed, said devices including elements adapted to receive between them the end folds of the wrapper and actuated to pinch such end folds about the end edges of the bed.

45. A powder folding machine comprising a support for a powder wrapper, a pivoted folder for turning up the edge of the wrapper, a knife for severing a wrapper from a continuous sheet, a pivotally mounted folder arranged to double over the edge of the wrapper opposite to the edge which is turned up by the first named folder, said knife being carried by the second named folder and projecting from the surface thereof, and means associated with the first named folder for engaging the wrapper and pulling the same away from the knife.

46. In a powder folding machine, a support for a powder wrapper, shearing knives for severing a wrapper from a continuous sheet, arranged so that the sheet may pass between said knives and rest on the bed, a folder underlying the wrapper at a distance from said knives, a second folder to which one of said knives is connected, said second folder being movable to carry the knife which is associated therewith past the complemental knife to sever the sheet, and means connected with the first folder arranged to engage the wrapper in the fold produced thereby and operable to draw the severed wrapper away from the movable knife.

47. In a powder folding machine, a support for a powder wrapper, a pivotally mounted folder for turning up one edge of the wrapper to receive the powder, and devices arranged and operated during the movement of said folder to lie over the wrapper substantially in line with the axis of said folder, whereby to locate the fold produced by the folder in a line close to the axis of the folder.

48. In a powder folding machine, a support for a powder wrapper, a pivoted folder arranged to form the fold which receives the powder, devices carried by said folder slightly eccentric to the axis thereof and arranged to overlie the edges of the wrapper, and means for rotating said folder about its axis, whereby said devices are caused to locate the fold near the axis of the folder and at the same time move the wrapper in a predetermined manner.

49. In a powder folding machine the combination, of a folder arranged and operated to form a fold adapted to receive the powder, a presser adapted to press against the surface of the folded wrapper at a distance from the powder-receiving fold, and means for moving said presser toward the fold.

50. In a powder folding machine, a folder arranged and operable to turn up the edge of a wrapper to provide a powder-receiving fold, and further operable to lay such turned up edge back against the wrapper, a presser, and means for operating said presser to press on the folded over part of the wrapper, and to move the presser toward the powder-receiving fold from a point relatively remote from such fold.

51. In a powder folding machine, a folder arranged and operable to turn up and fold back a portion of the powder wrapper to form a powder-receiving fold, a presser, a rock shaft by which said presser is carried, means for oscillating said rock shaft to move the presser toward and away from the folded wrapper, and means for moving said rock shaft endwise to carry the presser toward the fold.

52. In a powder folding machine, a folding device arranged and operable to double over one edge of a powder wrapper, and form a powder-receiving fold, a presser movable toward and away from the wrapper at a distance from such fold, said presser being also movable in the plane of the wrapper toward and away from the fold, and means for giving such movements to the presser.

53. In a powder folding machine, a folding device arranged and operable to double over one edge of a powder wrapper to form a powder-receiving fold, a pivotally mounted presser movable about its axis of oscillation toward and away from a portion of the wrapper at a distance from such fold, means for so moving said presser, and a cam arranged to move the presser in the direction of its axis toward the powder-receiving fold.

54. In a powder folding machine, a first folder adapted to turn up one edge of a wrapper to form a powder-receiving fold and to lay such edge against the body of the wrapper, a second folder arranged to turn up the opposite edge of the wrapper and fold it over the edge first turned up, a presser arranged over the location occupied by the second folded edge and mounted to move transversely toward the plane occupied by the wrapper, means for so moving said presser, the presser being also movable in the plane of the wrapper toward the powder-receiving fold, and a cam connected with the second folder arranged to engage and give the second described movement to the presser.

55. In a machine of the character described having folding instrumentalities and a striker or presser adapted to press against the surface of a paper folded by said instrumentalities and to move toward one of the folds thereof, a driving disk, and cams associated with said driving disk arranged to operate said presser or striker.

56. In a powder wrapping machine, a folding device, a member carried by said folding device in advance of the wrapper-engaging portion thereof, and arranged to fold over a part of a powder wrapper before such part is engaged by the folding device, and resilient means for advancing said member and holding it in engagement with the wrapper while the folding device advances.

57. In a powder folding machine, a folding device movable rotatably about an axis, a member pivoted to said folding device on substantially the same axis, and resilient means normally holding said member at an angle to the operative face of said folding device and angularly in advance thereof, whereby said member is adapted to commence a folding operation on a powder wrapper and to hold the part of the wrapper on which it acts while the folding device completes the folding operation.

58. A powder folding machine comprising a main frame, powder measuring and delivering means mounted on said main frame, a secondary frame detachably secured to said main frame, folding instrumentalities operably carried by said secondary frame arranged to hold a powder wrapper in position to receive powder from said delivering means, and to fold the wrapper about the powder, driving mechanism mounted on the main frame, a motion-transmitting means connected with the folding instrumentalities on the secondary frame, said last named means being arranged for operation by the driving mechanism, and the secondary frame being detachable with the folding instrumentalities and motion transmitting means bodily from the main frame.

59. In a powder folding machine, a support for a powder wrapper, a pivotally mounted folder arranged for turning up the end of the wrapper to receive the powder, fingers movably mounted approximately in line with the axis of said folder, said fingers being normally outside of the side edges of the paper, and means for projecting said fingers across the edges of the paper during the operation of said folder, whereby to locate the fold produced by the latter approximately in line with said axis.

In testimony whereof I have affixed my signature, in presence of two witnesses.

WILFORD A. HILL.

Witnesses:
A. C. RATIGAN,
ARTHUR H. BROWN.